United States Patent
Bak

[19]

[11] Patent Number: 5,906,841
[45] Date of Patent: May 25, 1999

[54] MOLD FOR A CLOSURE CAP

[75] Inventor: Kenneth Bak, Pittsfield, Mass.

[73] Assignee: Marland Mold, Inc.

[21] Appl. No.: 08/982,604

[22] Filed: Dec. 2, 1997

Related U.S. Application Data

[62] Division of application No. 08/752,250, Nov. 19, 1996, Pat. No. 5,744,082.

[51] Int. Cl.⁶ .................................................. B29C 45/40
[52] U.S. Cl. .......................... 425/556; 264/334; 425/409; 425/442; 425/809
[58] Field of Search ................................ 264/238, 328.1, 264/310, 334, 336; 249/68, 58, 170; 425/439, 517, 556, 409, 441, 442, DIG. 5, 809

[56] References Cited

U.S. PATENT DOCUMENTS

| | | |
|---|---|---|
| 2,875,472 | 3/1959 | Marcus . |
| 3,152,365 | 10/1964 | Fisher . |
| 3,356,044 | 12/1967 | Keathley et al. . |
| 3,477,095 | 11/1969 | Lensky . |
| 3,537,676 | 11/1970 | Miller . |
| 4,040,595 | 8/1977 | Tecco . |
| 4,340,352 | 7/1982 | Hayberg . |
| 4,351,630 | 9/1982 | Hayberg et al. . |
| 4,741,088 | 5/1988 | Ramella . |
| 4,744,741 | 5/1988 | Glover et al. . |
| 4,783,056 | 11/1988 | Abrams . |
| 4,812,116 | 3/1989 | Abrams . |
| 4,818,208 | 4/1989 | Byrne . |
| 4,897,032 | 1/1990 | Corteggiani . |
| 5,037,597 | 8/1991 | McGinley et al. . |
| 5,378,422 | 1/1995 | Musiel et al. . |
| 5,421,717 | 6/1995 | Hynds ...................................... 425/809 |

*Primary Examiner*—Tim Heitbrink
*Attorney, Agent, or Firm*—Hedman, Gibson & Costigan, P.C.

[57] ABSTRACT

The present inventions relates to a mold for forming a one piece flip-top cap and process for making such a cap. A mold for forming and closing the one piece flip-top cap prior to ejection from the mold includes a first mold part, an inner core mold part and a second mold part movable into relationship with the first mold part and the inner core mold so as to form a mold cavity therebetween. The mold produces a one piece flip-top cap with a living hinge between the body and lid of the cap and which is maintained in a closed position upon ejection from the mold. Pull straps are used to ensure full closure of the cap lid to the body prior to ejection.

12 Claims, 14 Drawing Sheets

MOLD FOR A CLOSURE CAP

This a divisional of application Ser. No. 08/752,250, filed Nov. 19, 1996, now U.S. Pat. No. 5,744,082.

FIELD OF THE INVENTION

The present invention relates to a mold for a threaded closure cap and, more specifically, a mold which forms the cap, closes the cap and ejects the cap in its closed configuration.

1. Background of the Invention

Molds for plastic parts are well known in the art. Additionally, as shown in U.S. Pat. No. 4,812,116, molds for creating vials with integral closure caps are known where the cap is closed about an elongated connector with a narrowed parting line. This, however, is problematic. Moreover, air is used to eject the vial.

Another significant problem with all molding is the time it takes for the part to be formed, cooled and ejected. This time is lengthened by the number of steps required to complete the process, the sequencing of the steps as well as the cooling method used.

It is therefore an object of the present invention to provide a mold for a threaded closure cap wherein the cap is sealed in its closed configuration prior to ejection from the mold.

It is a further object to provide such a mold which can speed the completion of the injection to ejection process.

2. Summary of the Invention

The present invention relates to a process for forming a one piece flip-top closure with a living hinge. More particularly, the invention relates to the ability to injection mold a flip-top cap which has a body and a lid, and rotate the lid portion 180 degrees to close it on the body portion resulting in a closed finished product without any ejection or match lines on the outside surface of the closure.

The process begins by injecting a molten material into a mold cavity defined on one side by a first mold, a pivotable mold part and an interior mold core part. On the other side is a second mold part, which is in contact with the first mold part.

The one piece flip-top cap is formed from this molten material such that it has a living hinge and a sealing means between the lid and body, preferably comprising a pentel and orifice. The pentel and orifice preferably include rounded transition surfaces in order to ease the interconnectivity between the two.

After injection of the molten material, the cap, including the body and the flip-top lid, is cooled. The second mold part is then retracted from the first mold part, thereby separating the second mold part from the one piece flip-top cap in its open position. A pivotable mold part, comprising a portion of the first mold part, pivots from an original position to a sealing position where it seals the flip-top lid onto the body and then returns to the original position.

Said pivotable mold part rotates by means of an air cylinder which pushes a rack, said rack, being interconnected with a pinion, said pinion being attached to said pivotable mold piece at the center line of said living hinge. Such interconnectivity allows said air cylinder to thereby rotate the pivotable mold part 180 degrees, from the original molding position to the sealing position, thereby closing the plastic cap.

Sealing of the flip-top lid to the body is aided by means of the rounded transition surfaces of the pentel and orifice such that the two interlock with one another. Pull straps cooperate with the ejector sleeve to push the body against the lid while the pivotable mold part is in the closed position thereby eliminating the gap between the lid and the body of the cap, due to shrinkage of the cooling plastic, after closure.

After conclusion of the sealing, the air cylinder reverses, thereby reversing the sealing action of the pivotable mold part so as to rotate the pivotable mold part back to the original position, thereby leaving the cap sealed.

The sealed one piece flip-top cap is then ejected from the mold by means of an ejector sleeve which is situated along the walls of the mold cavity. The ejector sleeve projects into the cap along the interior walls thereof.

The present invention overcomes the prior art problems by increasing the efficiency of the molding process, and effectively ensuring complete ejection of the finished product. These advances are reflected in the following changes:

- rapidly cooling a molten material through the use of an additional water cooling channel located in the pivotable mold piece defining one side of the lid;
- sealing the cap during retraction of second mold part from first mold part; and
- ejecting a finished product from the mold by means of an ejector sleeve, thereby avoiding unreliable air assist ejection.

BRIEF DESCRIPTION OF THE DRAWINGS

Preferred embodiments of the present invention will be described in greater detail with reference to the accompanying drawings, wherein like members bear like reference numerals and wherein.

DETAILED DESCRIPTION OF THE PREFERRED EMBODIMENTS

Figure 1:
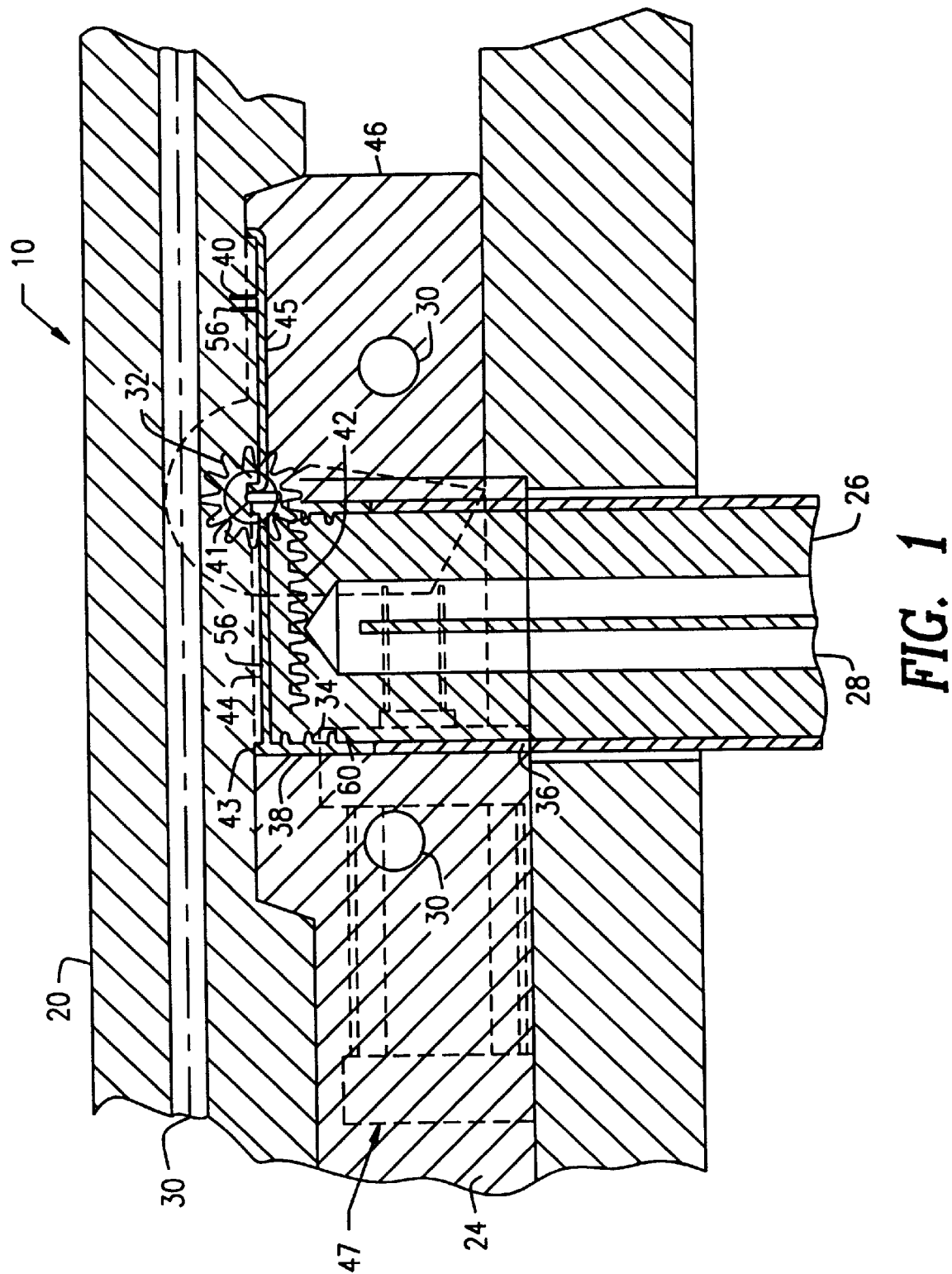
FIG. 1 is a side view, in cross section, of the preferred embodiment of a mold according to the present invention.
Figure 2:
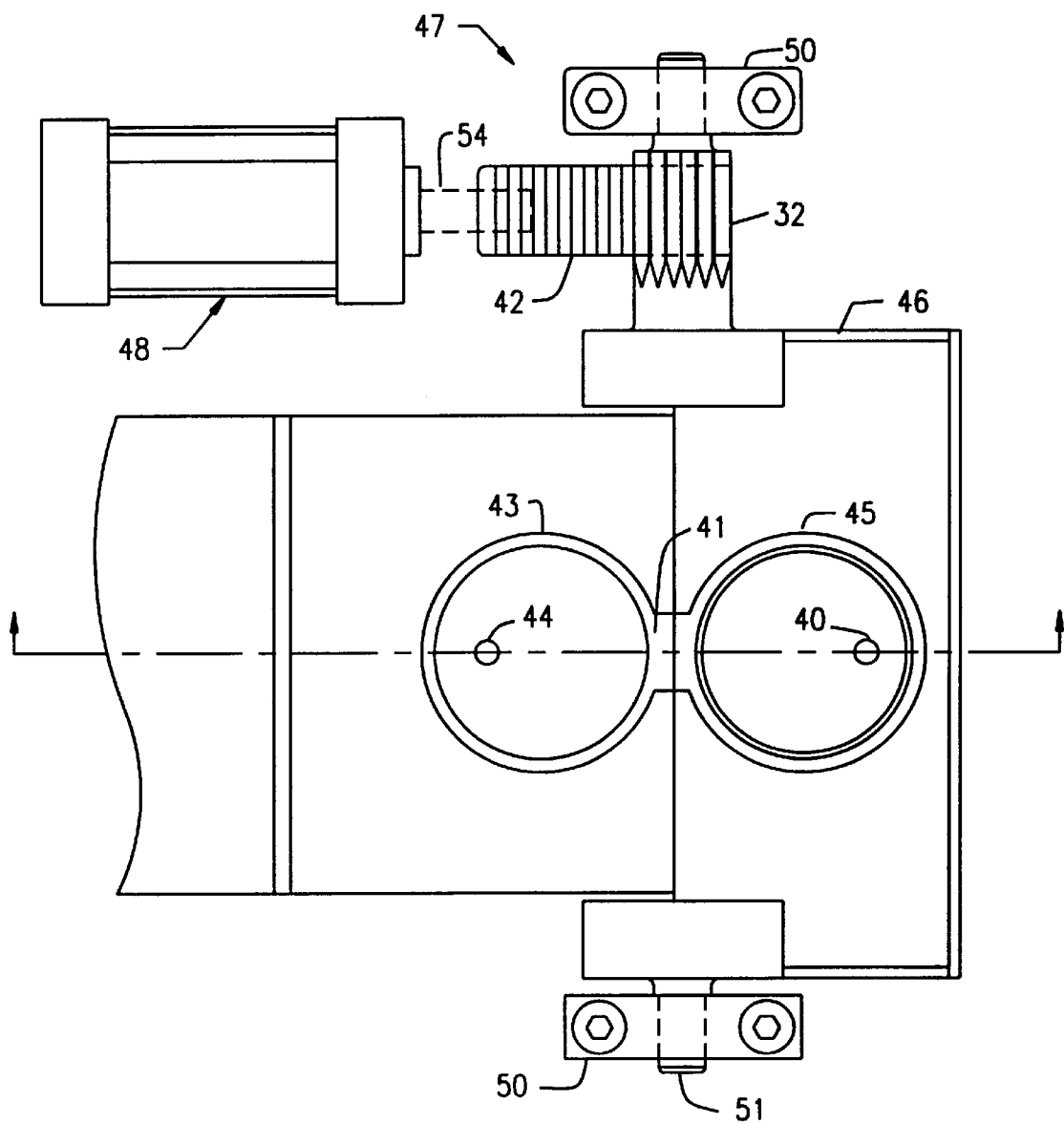
FIG. 2 is a top view of both the pivoting means and the pivotable mold part used in the mold depicted in FIG. 1.
Figure 3:
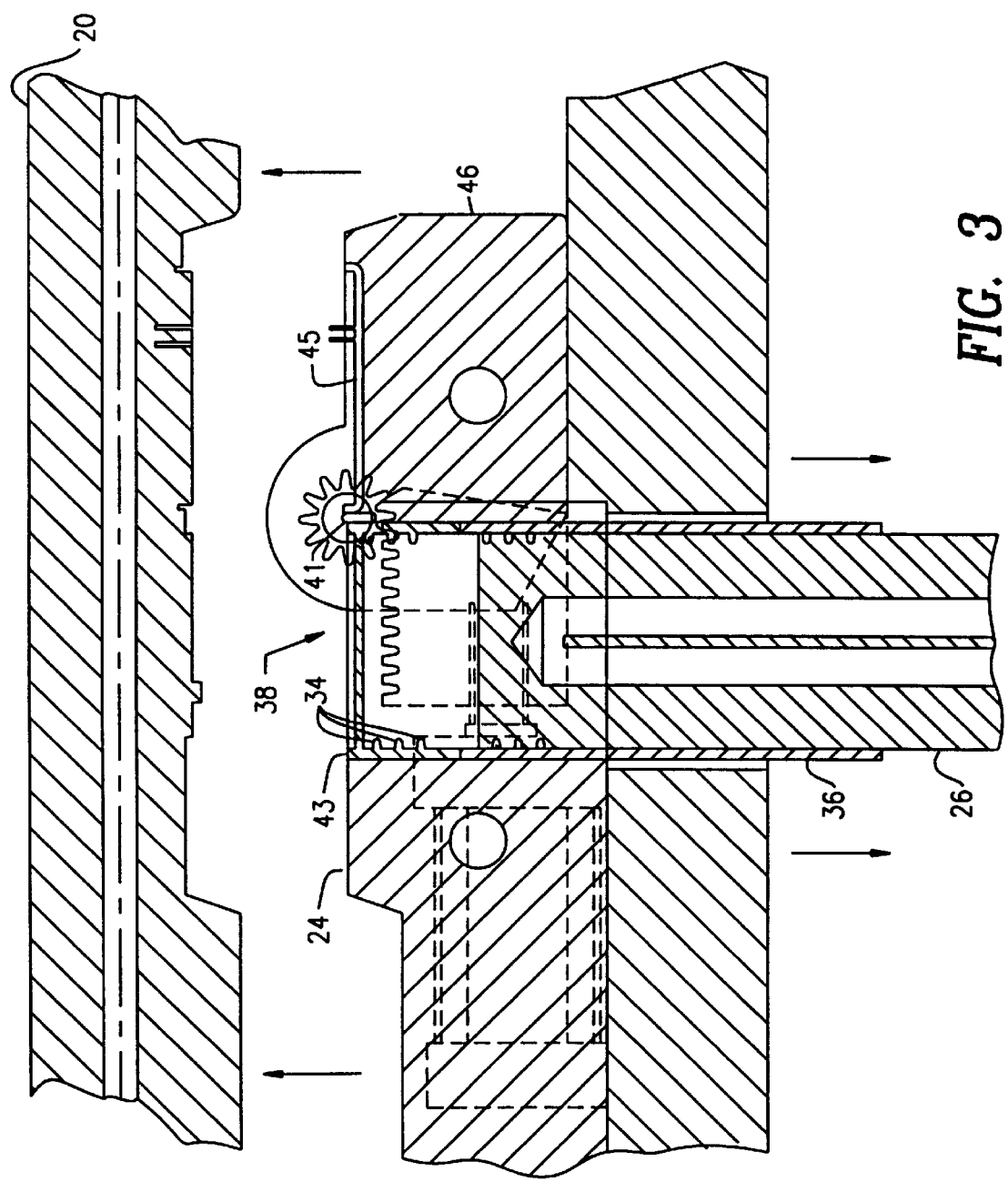
FIG. 3 is a side view, in cross section, of the preferred embodiment of the mold during retraction of a second mold part from a first mold part.
Figure 4:
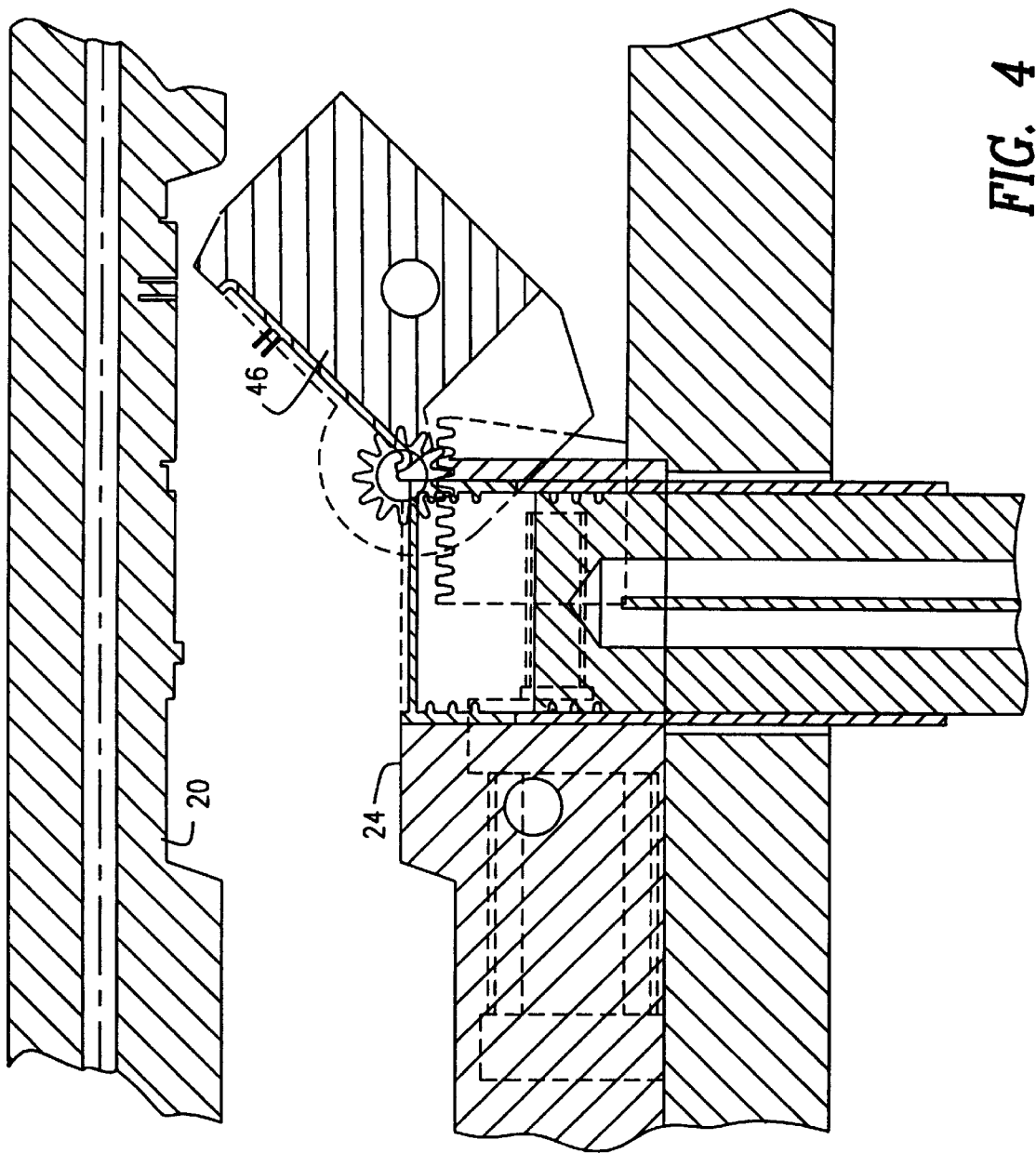
FIG. 4 is a side view, in cross section, of the preferred embodiment of a mold during retraction of the second mold from a first mold part as the pivotable mold part begins pivoting.
Figure 5:
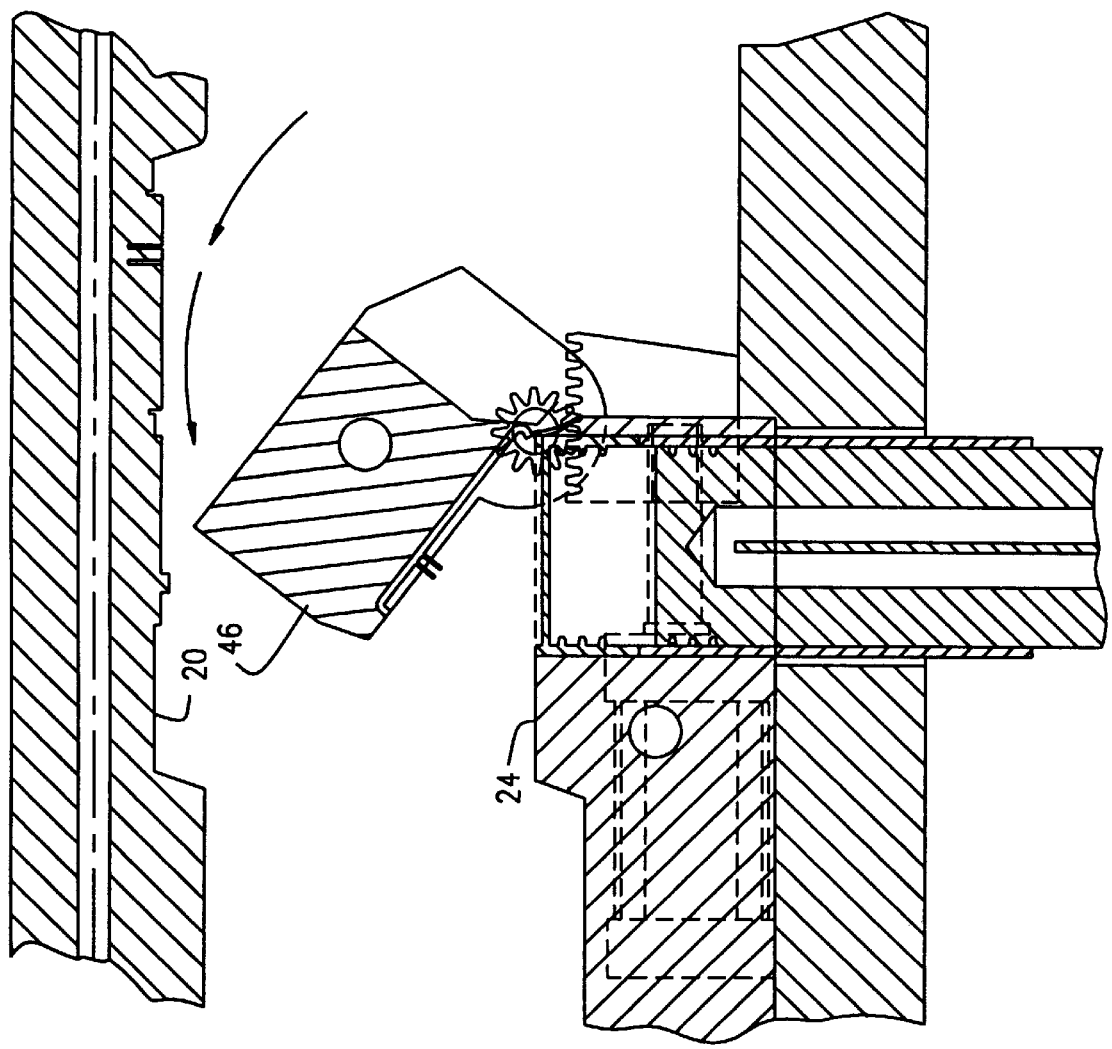
FIG. 5 is a side view, in cross section, of the preferred embodiment of a mold during retraction of the second mold from a first mold part with a pivotable mold as it pivots the lid toward the body about a living hinge.

With reference to FIGS. 1 and 2, a preferred embodiment of a mold 10 according to the present invention is provided for making a one piece flip-top cap 38. The one piece flip-top cap 38 is preferably injection molded in the mold 10 from a thermoplastic material, preferably plastic. The one piece flip-top cap 38 includes a living hinge 41. In the interest of fostering efficiency, the mold 10 is adapted so as to seal the lid 45 of the one piece flip-top cap 38 onto the body 43 in a sealing manner while the cap 38 is still in the mold 10.

With specific reference to FIG. 1, the mold 10 primarily includes a first mold part 24, an interior core mold part 26, a second mold part 20, and a pivotable mold part 46. The first mold part 24 is preferably comprised of 420 stainless steel HRC 48-52; the interior core mold part 26 is preferably comprised of A-10 steel HRC 56-58; the second mold part 20 is preferably comprised of 420 stainless steel HRC 48-52; and the pivotable mold part of 440 stainless steel HRC 56-58.

The second mold part 20 is arranged so as to be substantially in contact with the first mold part 24 and the pivotable mold part 46 when in the original, closed configuration. During such configuration, said second mold part 20 is preferably arranged so as to interlock with said first mold part 24 and said pivotable mold part 46 across a parting line situated between the parts. The pivotable mold part 46, is arranged adjacent the first mold part 24, across from the second mold part 20, and is pivoted by a pivoting means 47.

The interior core mold part 26 is mounted within the first mold part 24 so as to provide a mold surface for forming the interior wall 60 of the one piece flip-top cap 38. The interior core mold part 26 is adapted so that when the flip-top cap 38 hardens, it threadedly engages the interior core mold part 26 with threads 34 on the interior wall 60 of the cap 38.

With specific reference to the sizes of the various molds, there are no size limitations on the molded one piece flip-top cap 38, and hence, the sizes of the pieces will vary according to individual application. It is noted, however, that the living hinge 41 is most preferably of a 0.020 inch thickness on a ½ inch diameter cap 38 with a preferred length of 1/16 inch to 1 inch between the lid.

Figure 11:
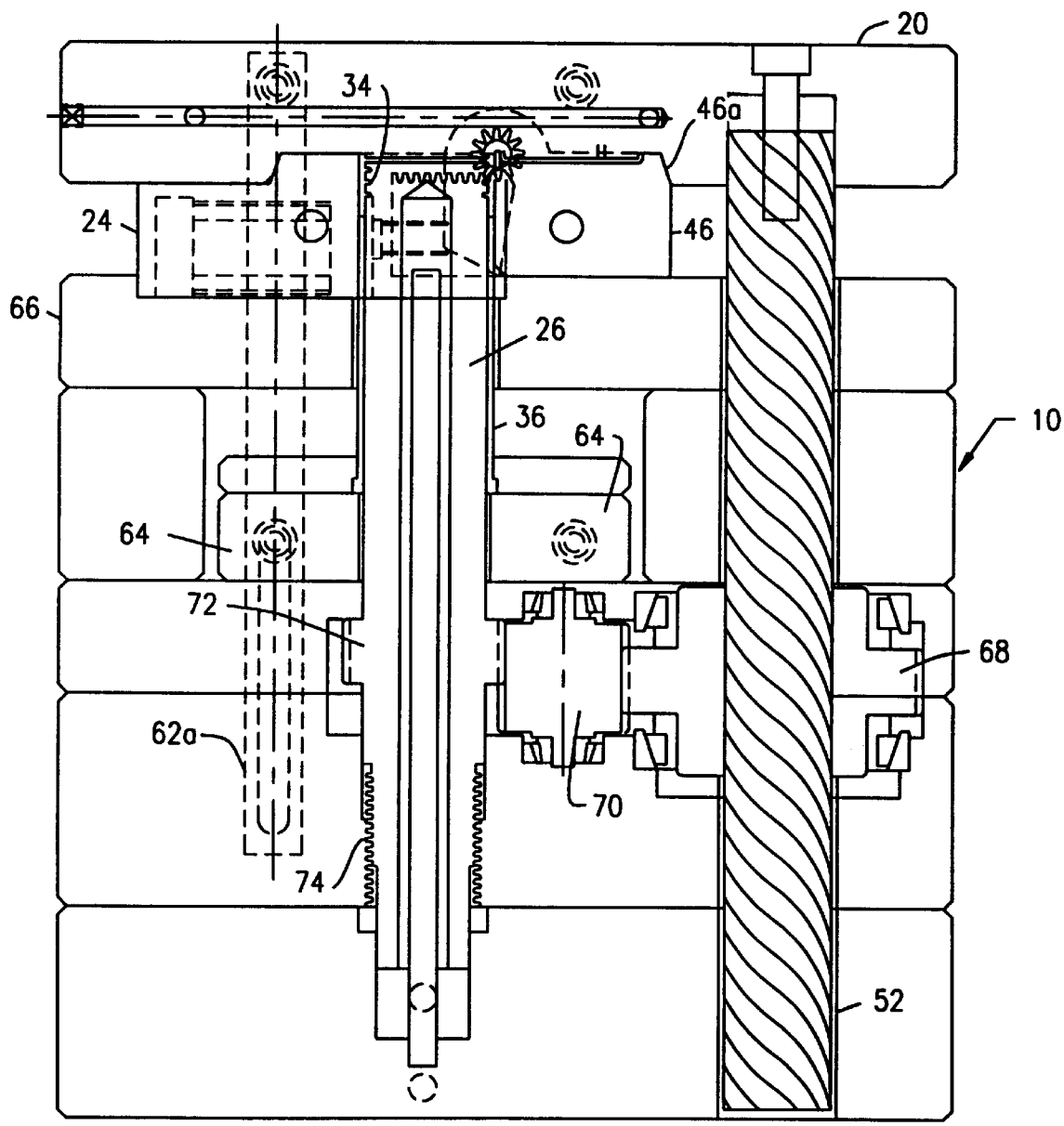
FIG. 11 is a side view, in cross section, of the preferred embodiment of the present mold including the preferred pull straps, ejector sleeve, ejector sleeve actuator, and spiral rack and pinion.

An ejector sleeve 36 is provided within first mold part 24 adjacent the interior core mold part 26, so that when the molten material has hardened, the one piece flip-top cap 38 may be reliably ejected from the mold. In a preferred embodiment, said ejector sleeve 36 is formed from the preferred material of 440 C HRC 56-58. Unlike the prior art, which relies on air assisted ejection, this ejection system utilizes a spiral rack 52 and pinion 68 and an ejector sleeve 36 (FIG. 11).

In the ejection system of the present invention, shown in FIGS. 11–14, the teeth 69 on the pinion 68 associated with the spiral rack 52 engage an intermediate cog wheel 70 associated with cog teeth 72 on the inner mold core part 26 to rotate the inner mold core part 26. Threads 74 at the bottom of the inner mold core part 26 raise or lower the inner mold core part 26 depending on the direction the inner mold core part 26 is rotated by the spiral rack and pinion 68.

In this way, when the second mold part 20 is retracted from the first mold part 24 the spiral rack 52 and pinion 68 rotate intermediate cog wheel 70 which rotates the inner mold core part 26 so as to lower the inner mold core part 26 on the lower threads 74, thereby disengaging the threads 34 of the molded cap 38 prior to ejection. To perform this function, the threads 74 at the bottom of the mold core 26 are equivalent to the threads 34 of the molded cap. After ejection of the cap 38, the second mold part 20 is lowered causing the inner mold core 26 to be rotated and raised on threads 74 for the next injection of molten material into the mold.

Provided within the mold pieces 20, 24 and 46 are cooling channels 30 in order to accelerate the cooling of the flip-top cap 38. Desirable cooling efficiency and time savings are further achieved through the circulation of coolant (e.g., water) through the cooling channel 30, including through pivotable mold part 46.

The cooling channel 30 of mold parts 20, 24 and 46 are situated longitudinally in such a way as to maximize contact with the portions of the respective mold blocks subject to the greatest heat dissipation from the cooling of molten material.

Turning to pivoting means 47, best seen in FIG. 2, the pivotable mold part 46 is arranged adjacent an air cylinder 48 which activates a rack 42 and pinion 32. The pinion 32 engages the pivotable mold part 46 and terminates in a hinge pin 51, which is connected to a hinge block 50. When the air cylinder 48 is activated the piston 54 moves the rack 42 which, in turn, rotates the pinion 32 attached to the pivotable mold part 46. Rotation of the pinion 32 results in closing the pivotable mold part 46 about the axis of the hinge pin 51.

With respect to the preferred materials of the pivoting means 47, the hinge pin 51 is preferably comprised of H-13 HRC 52-54; the hinge block 50 is preferably comprised of 414 prehardened stainless steel; a hinge bushing is comprised of A-10 HRC 58-60; the rack 42 is preferably comprised of H-13 HRC 52-54 and the pinion 32 is preferably comprised of H-13 HRC 52-54.

Figure 12:
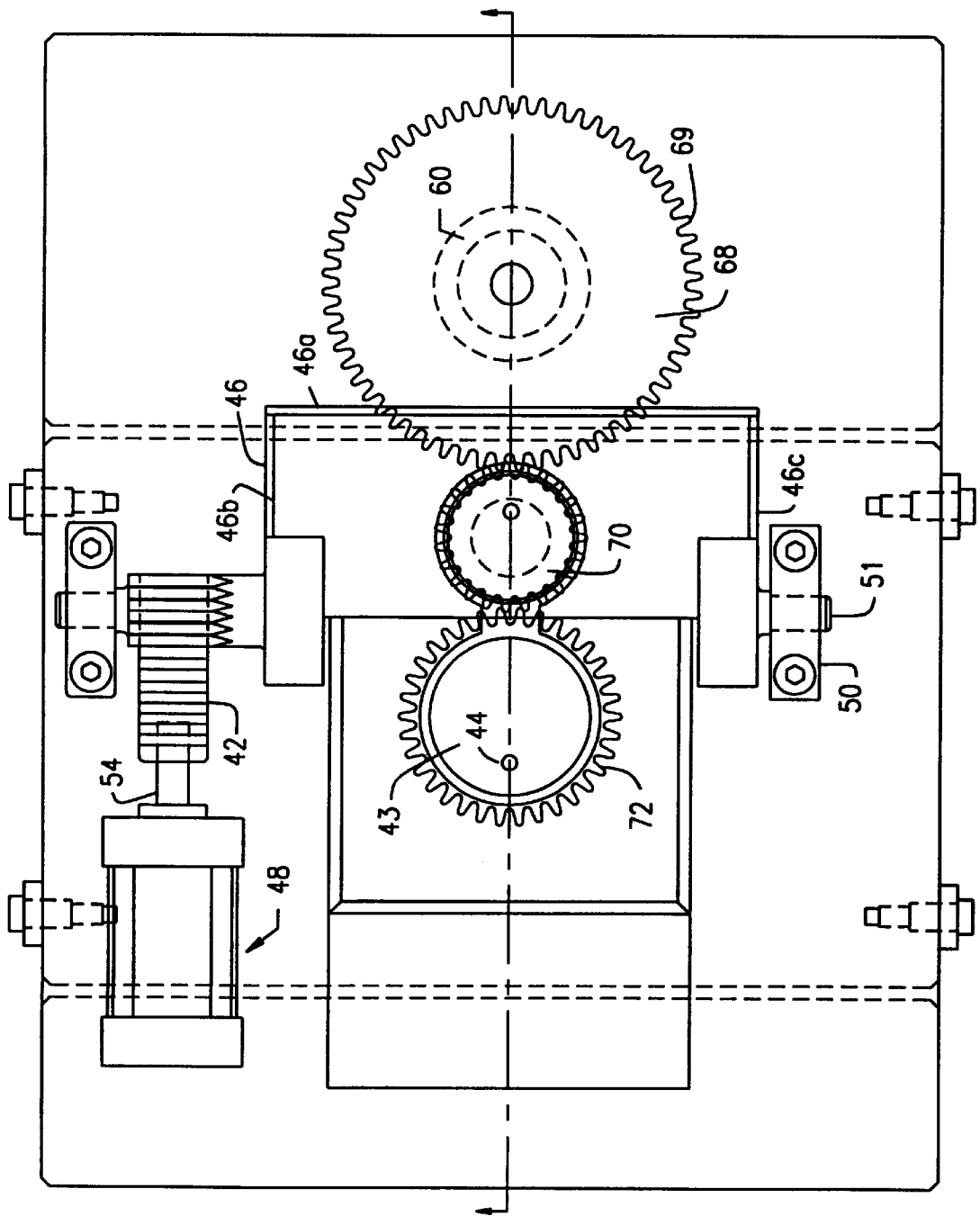
FIG. 12 is a top view, in partial cross section, of the preferred embodiment of the present mold, including the spiral rack and pinion for moving the interior mold core from its mold position to its ejection position.

A preferred embodiment is depicted in FIG. 12 where the pivotable mold part 46 is seated on three sides, 46a, 46b and 46c so as to interlock the second mold part and the pivotable mold piece across their parting line (see also FIG. 11). In this preferred embodiment, the cap may be closed while situated on the first mold part 24 (FIG. 6).

With reference to FIGS. 3–6 when the one piece flip-top cap 38 has sufficiently cooled, the second mold part 20 withdraws from the first mold part 24 containing the cap body 43 and the open pivotable mold part 46 containing the lid 45. During the retraction of the second mold part 20, the pivotable mold part 46 is pivoted by means of the rack 42 and pinion 32 system so as to bend the living hinge 41 of the cap 38.

Full rotation of the pivotable mold part 46 results in interconnecting and sealing the lid 45 and body 43 of the flip-top cap 38 while the flip-top cap 38 remains seated within the first mold part 24. When the interconnection and sealing of lid 45 and body 43 of the flip-top cap 38 occurs, the pivotable mold part 46 guides the pentel 40 on the lid 45 into orifice 44 of the body 43, where the interconnectivity is facilitated by means of rounded transition surfaces 56.

Figure 6:
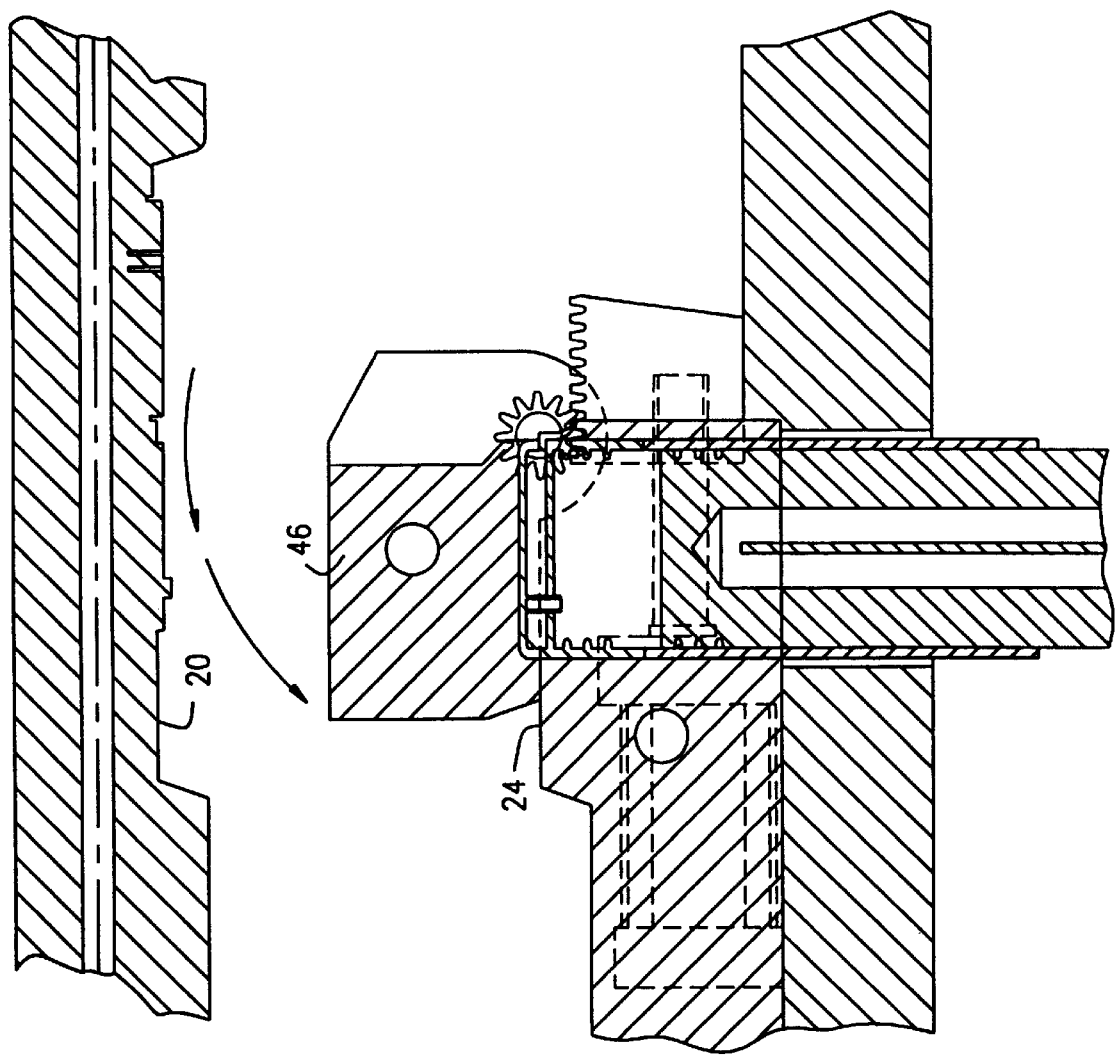
FIG. 6 is a side view, in cross section, of the preferred embodiment of a mold during retraction of the second mold from a first mold part with pivotable mold as it pivots and seals the lid of the one piece flip-top cap utilizing an orifice and an interconnective flip-top pentel.

While there are no limitations on the size of the components, in a preferred embodiment, said pentel and said orifice will be of similar dimensions so that said pentel and said orifice snap shut when fully engaged as in FIG. 6.

Figure 13:
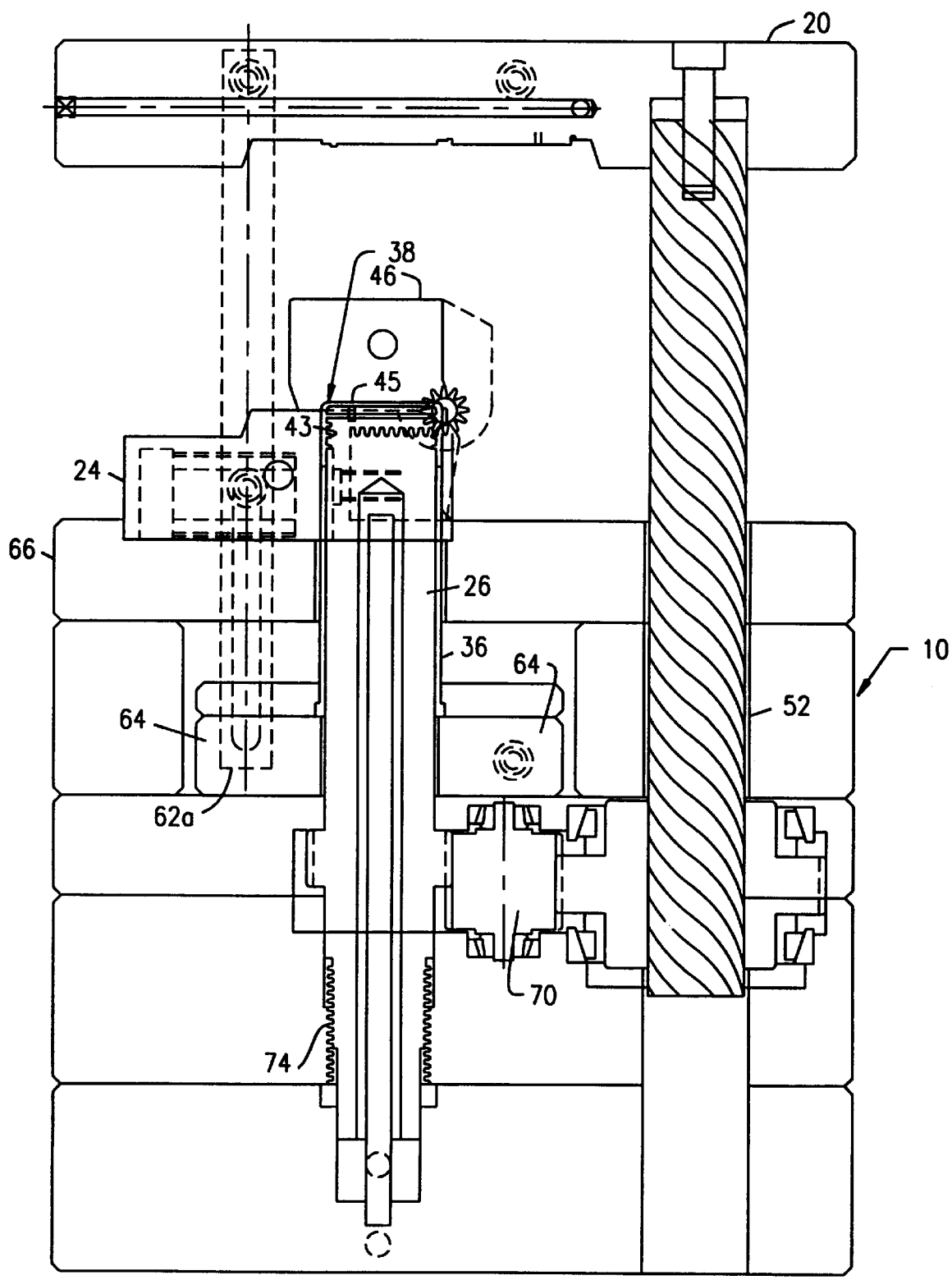
FIG. 13 is a side view, in cross section, of the preferred embodiment of the mold with the second mold part fully retracted, the pivotable mold part fully engaged with the lid closed on the cap and the pull straps fully engaged.

In FIG. 13 pull straps 62a and b as well as 62c and d (not shown) located between the second mold part 20 and ejector sleeve actuator 64 are used to complete the closure of the lid 45 on the body 43. The straps 62a, b, c and d engage the actuator 64 and pull the body 43 and lid 45 together, eliminating any gap left between the lid 45 and body 43 due to shrinkage of the cooled plastic.

Figure 7:
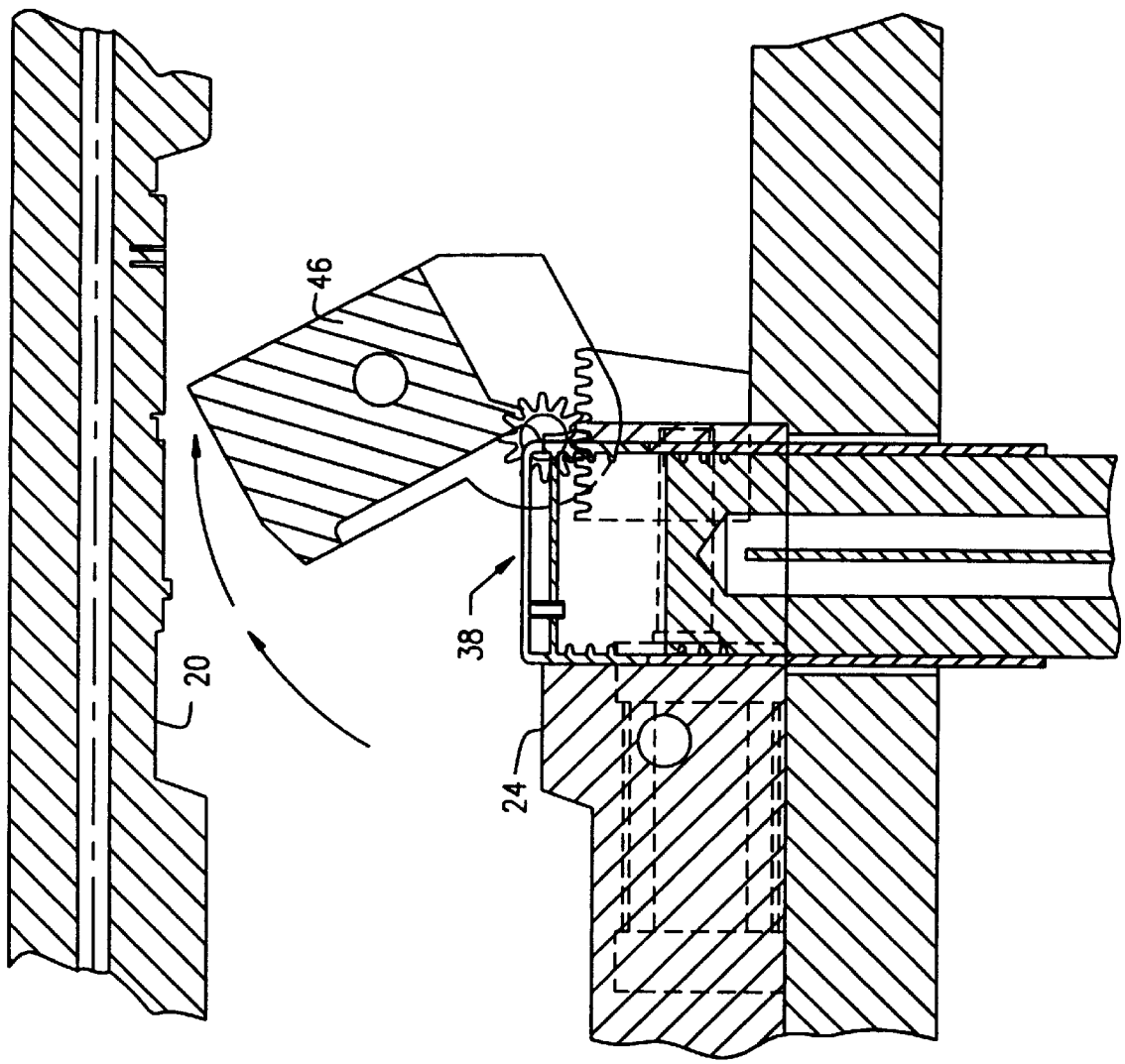
FIG. 7 is a side view, in cross section, of the preferred embodiment of a mold with a pivotable mold part, after having sealed the one piece flip-top cap, pivoting and returning to its original position.
Figure 8:
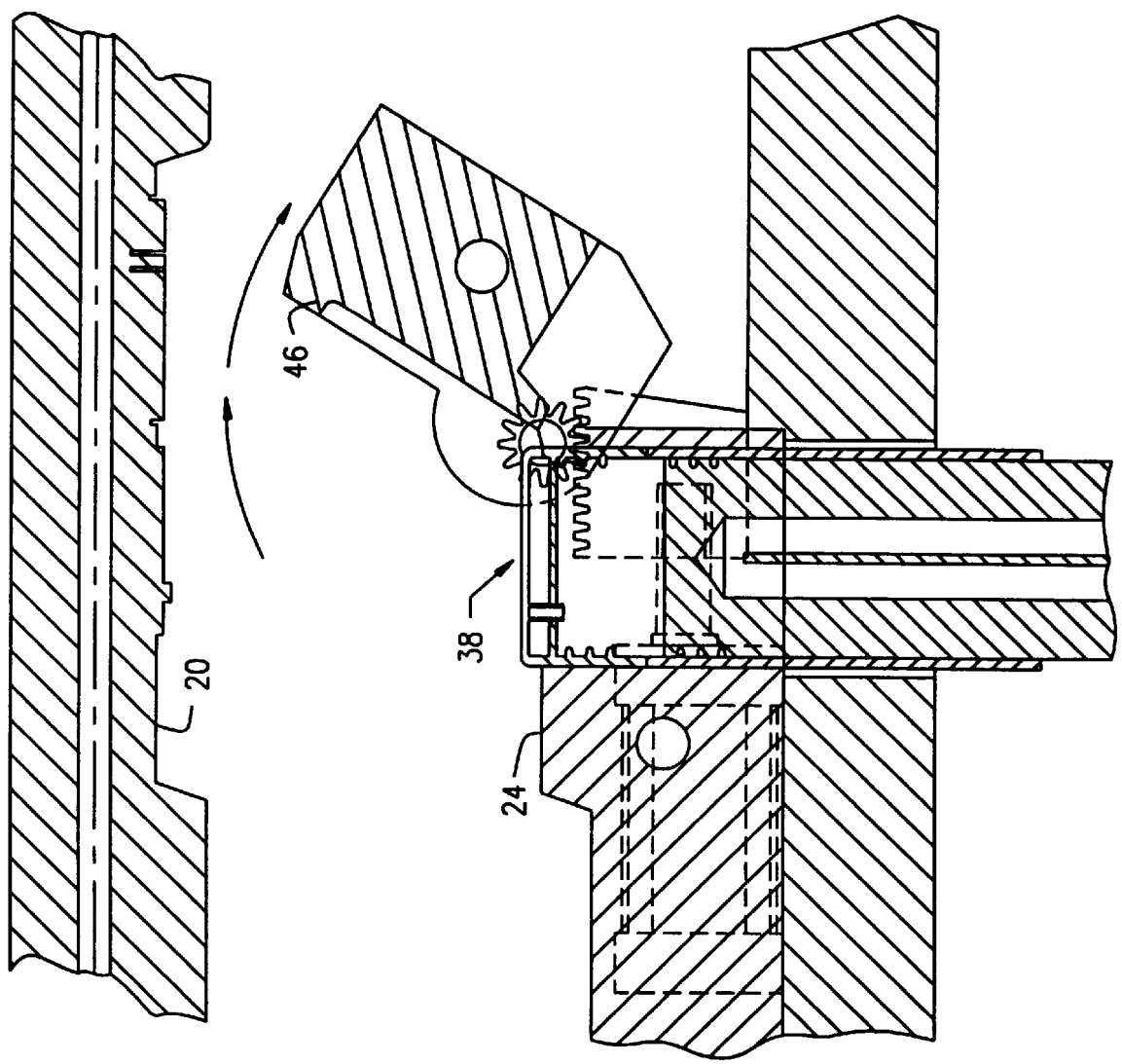
FIG. 8 is a side view, in cross section, of the preferred embodiment of a mold with a pivotable mold part pivoting as it nears return to the original position.
Figure 9:
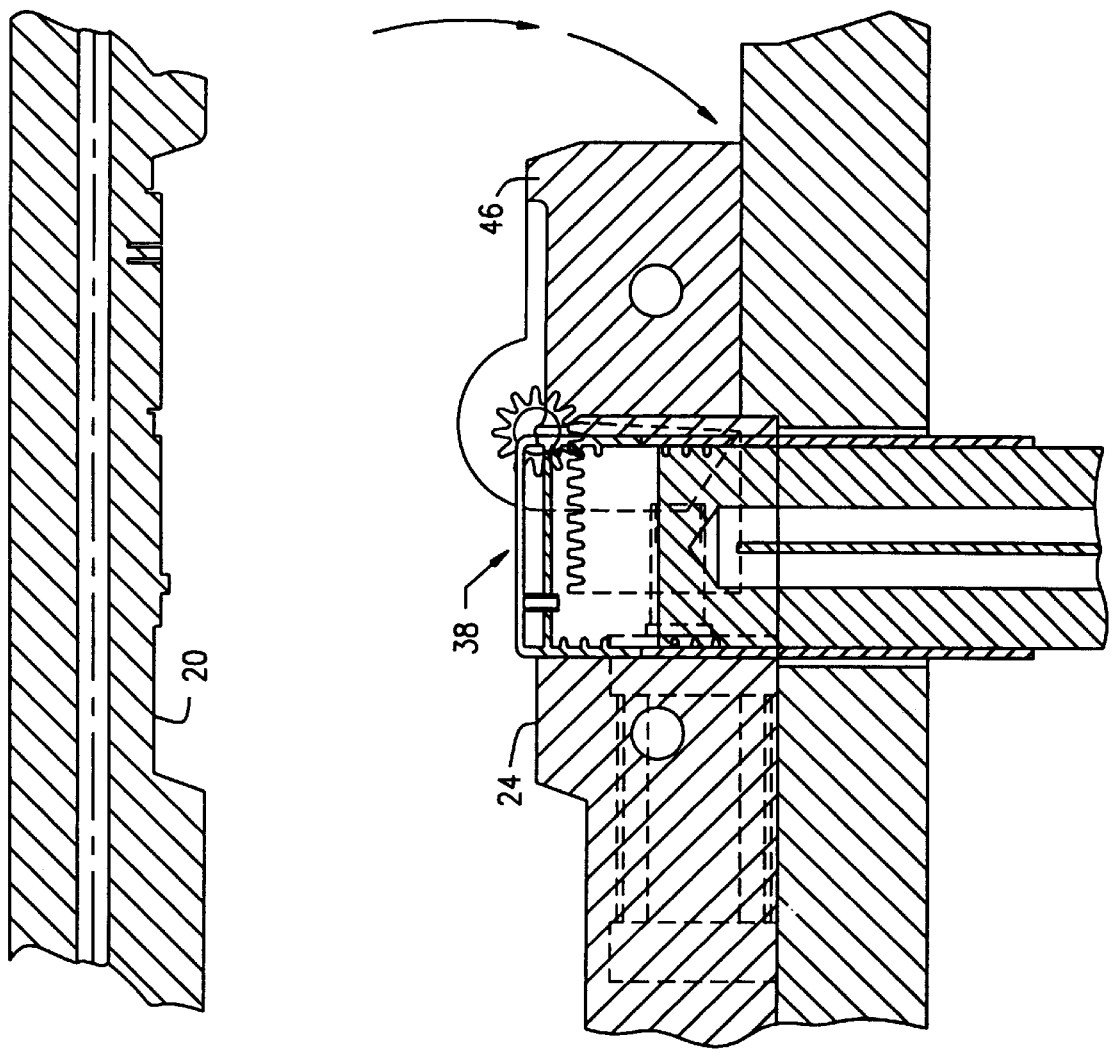
FIG. 9 is a side view, in cross section, of the preferred embodiment of a mold with a pivotable mold part at rest in its original position.
Figure 10:
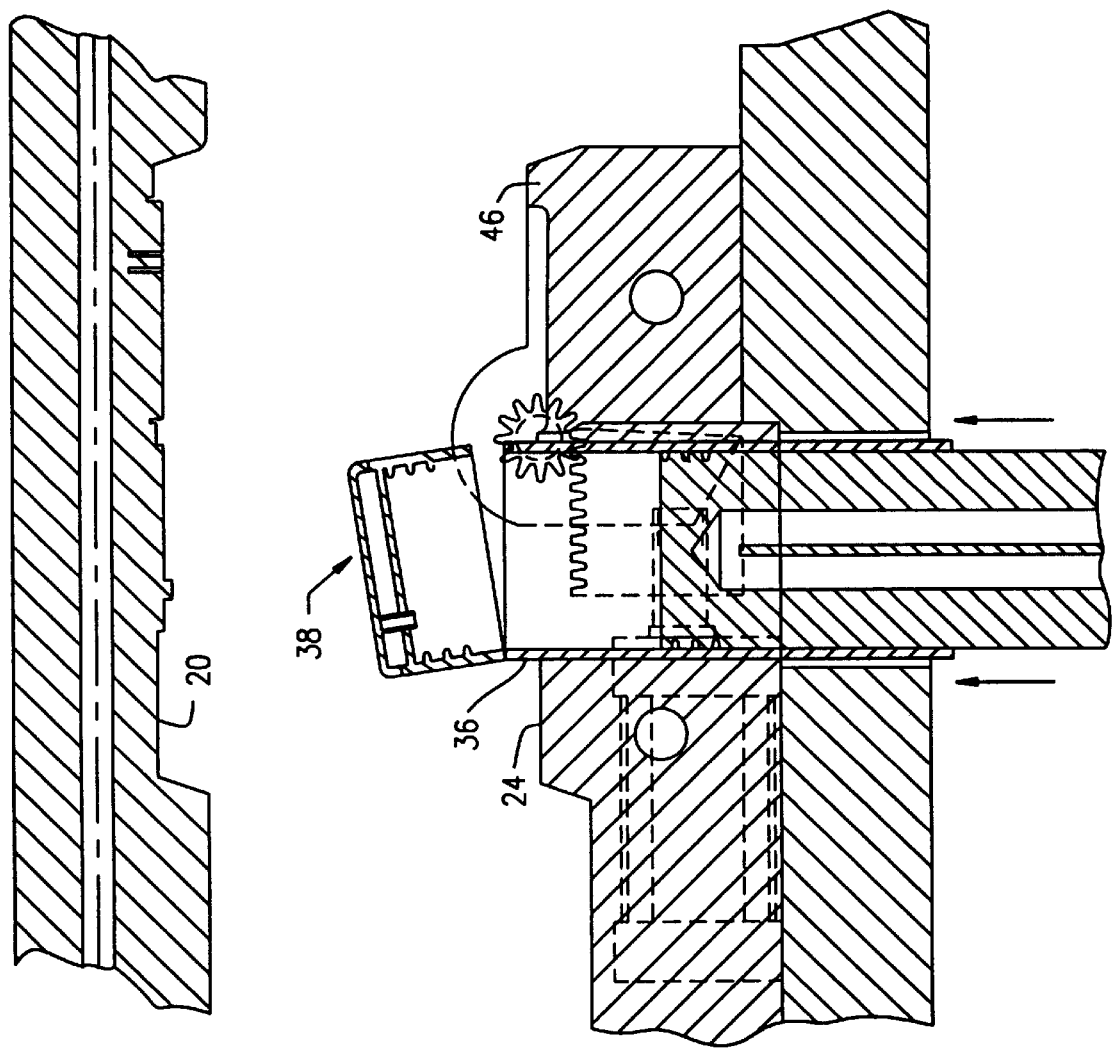
FIG. 10 is a side view, in cross section, of the preferred embodiment of a mold with a sleeve part ejecting the sealed, finished product at the end of the molding cycle.

After the sealing of the lid 45 on the body 43 is complete, as shown in FIGS. 3–6, the pivotable mold piece 46 is returned to original position, as shown in FIGS. 7–9.

Figure 14:
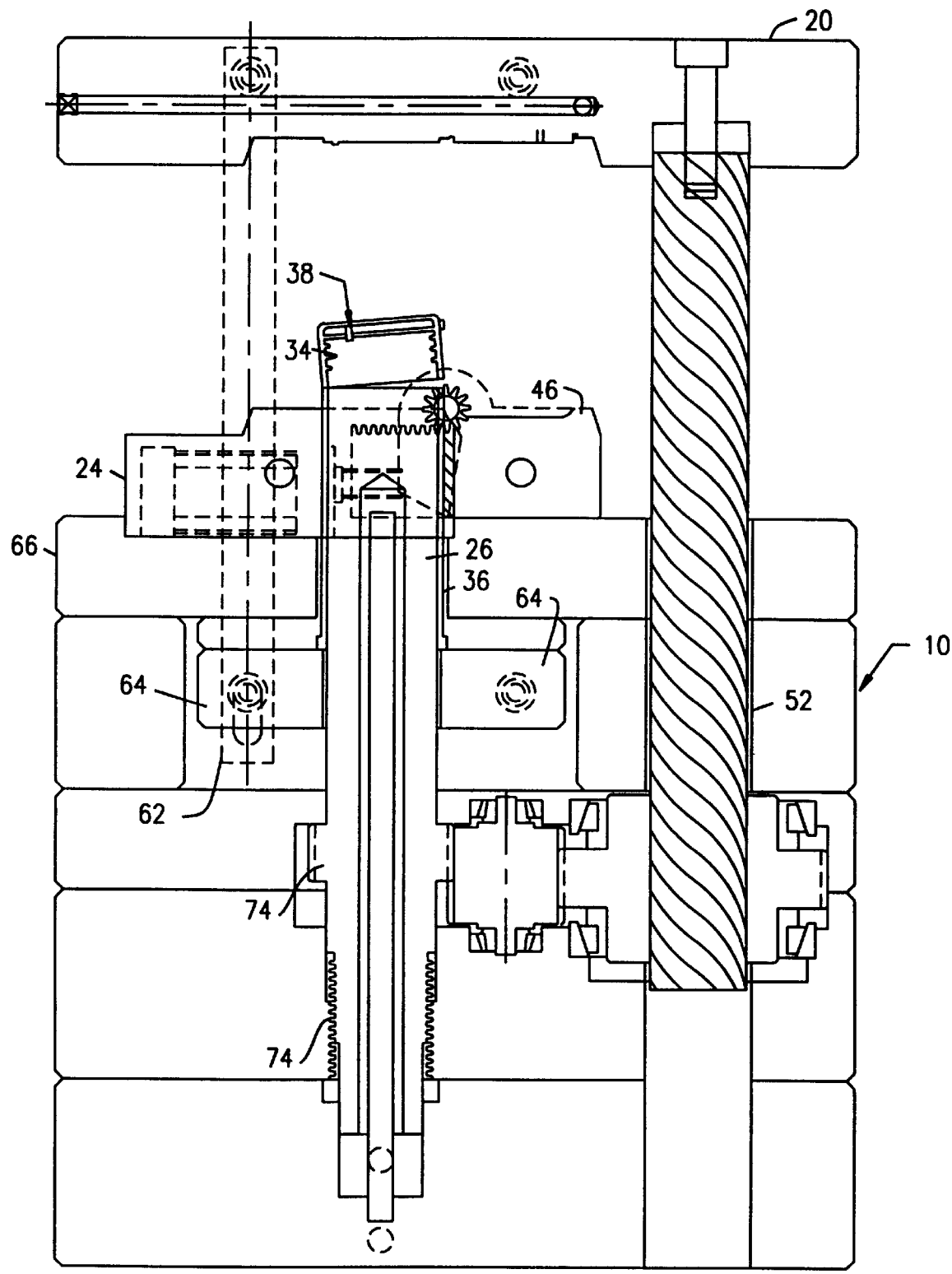
FIG. 14 is a side view, in cross section, of the preferred embodiment of the mold part where the ejector sleeve is fully engaged for ejection of the sealed finished product from the mold.

Turning attention to FIG. 14, when the sealing of the one piece flip-top cap 38 is complete, and after pivotable mold part 46 has returned to the original position, the closed flip-top cap 38 is ejected. Prior to ejection, the threads 34 on the body 43 of the flip-top cap 38 are unscrewed from interior core mold part 26, as set forth above, to disengage the interior core mold part 26 from the cap 38.

The closure and ejection portions of the process are illustrated in FIGS. 11, 12, 13 and 14. A spiral rack 52 is anchored to the second mold part 20 such that when said second mold part 20 is retracted to permit the pivotable mold part 46 to seal the one piece flip-top cap 38 the spiral rack 52 turns pinion 68. Gears 69 on the pinion 68 engage the intermediate cog wheel 70 which in turn rotates interior core mold part 26 by means of a cooperative relationship with the cog teeth 72 on the interior core mold part 26. When inner mold part 26 is rotated, the mold part 26 is raised or lowered, depending on direction of rotation, by threads 74 located at the bottom of inner mold part 26.

Retraction of the second mold part 20 also pulls on pull straps 62a–d. When pull straps 62a–d are pulled by the second mold part 20 with the pivotable mold part 46 in its closed position, the pull straps 62a–d engage the ejector sleeve actuator 64. The ejector sleeve actuator 64 raises the ejector sleeve 36 so as to push the closed body 43 against the lid 45 held in the closed pivotable mold part 46, thereby eliminating the gap between the body 43 and lid 45 due to shrinkage of the cooled plastic.

After disengagement and sealing of the flip-top cap 38 an ejector sleeve 36 actuated by an actuator 64 pushes the completed flip-top cap 38 out of the mold 10 (see FIG. 14).

Although the time involved in molding, cooling, sealing and ejecting the one piece flip-top cap 38 may change according to the molten material used, in the preferred embodiment the entire cycle is run in about 20–25 seconds.

Various modifications to the above invention will become apparent to those skilled in the art, all of which are intended to fall within the spirit and scope of the present invention, limited only by the appended claims. All patents and publications referred to herein are hereby incorporated by reference.

What is claimed is:

1. A mold for forming a one piece flip-top cap, having a body portion and a lid portion connected by a living hinge, comprising:

a first mold part having a first mold part cavity;

an interior core mold part situated in said first mold part cavity;

a pivotable mold part;

activation means for pivoting the pivotable mold part; and a second mold part cooperating with said first mold part, said core mold part and said pivotable mold part so as to define a mold cavity for forming said one piece flip-top cap.

2. The mold of claim 1 further comprising an ejector sleeve for ejecting said one piece flip-top from said mold.

3. The mold of claim 1 further comprising cooling means comprising a cooling channel through the first mold part and the pivoting mold part so as to cool the body and the lid of the one piece flip-top cap.

4. The mold of claim 1 wherein said activation means includes a rack and pinion for pivoting said pivoting mold part.

5. The mold of claim 1 wherein said pivotable mold part has seating means on three sides thereof which cooperate with corresponding seating means on said second mold part.

6. The mold of claim 1 wherein said interior core mold part has threads at an area within the cap to form a threaded interior surface of the cap.

7. The mold of claim 6 further comprising a spiral rack and pinion for rotatable disengaging said interior core mold part from said flip-top cap.

8. The mold of claim 7 wherein the interior core mold part has additional threads at an area out of the cap, said threads being equivalent to those threads at the area within the cap, for retracting the interior mold core from the threaded cap as the interior mold core is rotated.

9. The mold of claim 2 wherein the ejector sleeve is activated by actuator means.

10. The mold of claim 1 further comprising pull straps for fully closing the one piece cap prior to ejection.

11. The mold of claim 10 wherein the pull straps cooperate with the second mold part and the ejector sleeve to fully close the one piece cap.

12. The mold of claim 11 wherein the pull straps are operatively connected to the second mold part and ejector sleeve actuator means.

* * * * *